March 19, 1968  M. SCHRAG  3,373,634
COMPACT TRANSMISSION

Filed Feb. 18, 1965  3 Sheets-Sheet 1

March 19, 1968  M. SCHRAG  3,373,634

COMPACT TRANSMISSION

Filed Feb. 18, 1965  3 Sheets-Sheet 2

United States Patent Office 3,373,634
Patented Mar. 19, 1968

3,373,634
COMPACT TRANSMISSION
Manfred Schrag, Heidenheim (Brenz), Germany, assignor to Voith Getriebe KG., Heidenheim (Brenz), Germany
Filed Feb. 18, 1965, Ser. No. 433,753
Claims priority, application Austria, Feb. 25, 1964, A 1,584/64
3 Claims. (Cl. 74—661)

ABSTRACT OF THE DISCLOSURE

The present invention relates to a hydrodynamic transmission with torque converter and mechanical transmission part in which the guide wheel housing together with the bearing housing for the mechanical transmission part forms a self-supporting unit in the form of one work piece.

According to the invention the said housing is provided with longitudinal flanges to permit combining said transmissions to self-supporting duplex transmissions.

---

The present invention relates to a compact transmission and, more specifically, concerns a transmission, preferably for vehicles, which comprises at least one torque converter with input or output through gear means.

It is known to combine the stationary housing of fluid flow machines and that part of the outer housing of the fluid flow transmission pertaining thereto while permitting the installation of inner members, and to connect the said housings by means of flanges at the end faces thereof so as to build up a fluid flow transmission.

It is an object of the present invention further to develop this building block principle and to simplify the construction thereof.

It is also an object of this invention to provide a transmission of the above-mentioned type, which will represent a stable weight-saving design allowing a considerable reduction in the production time.

It is still another object of this invention to provide a transmission as set forth above, which will greatly simplify the housing part and permit to produce such transmissions with considerably thinner housing walls than heretofore possible.

Figure 1:
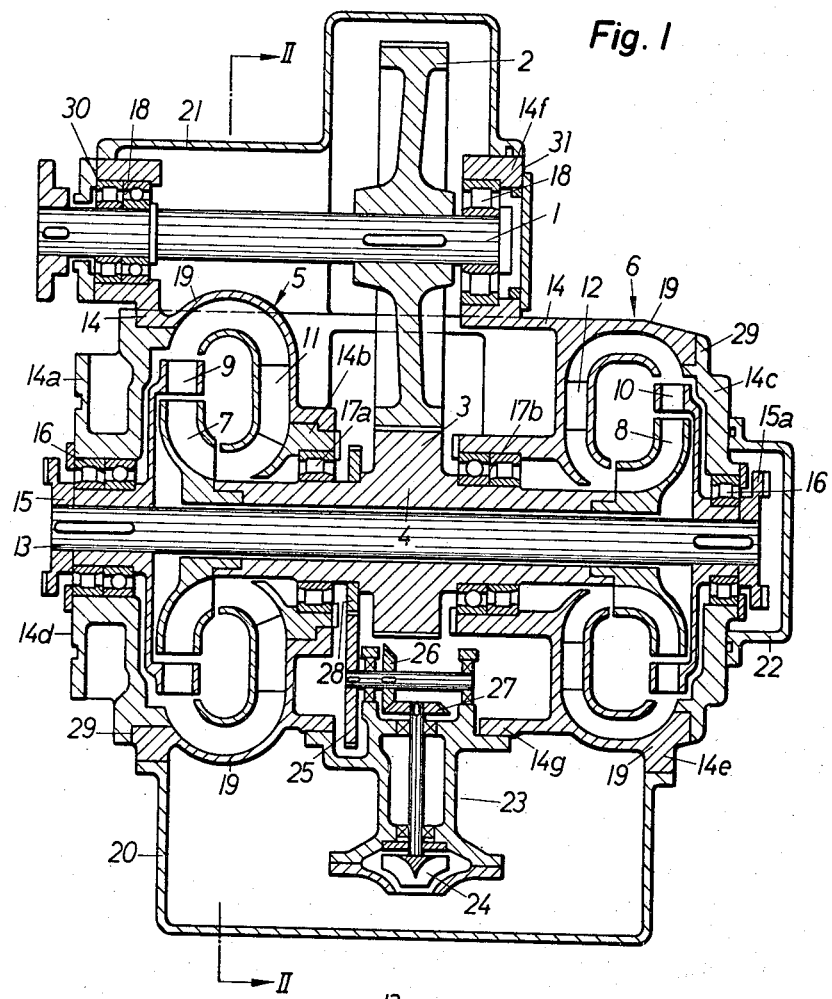
Figure 2:
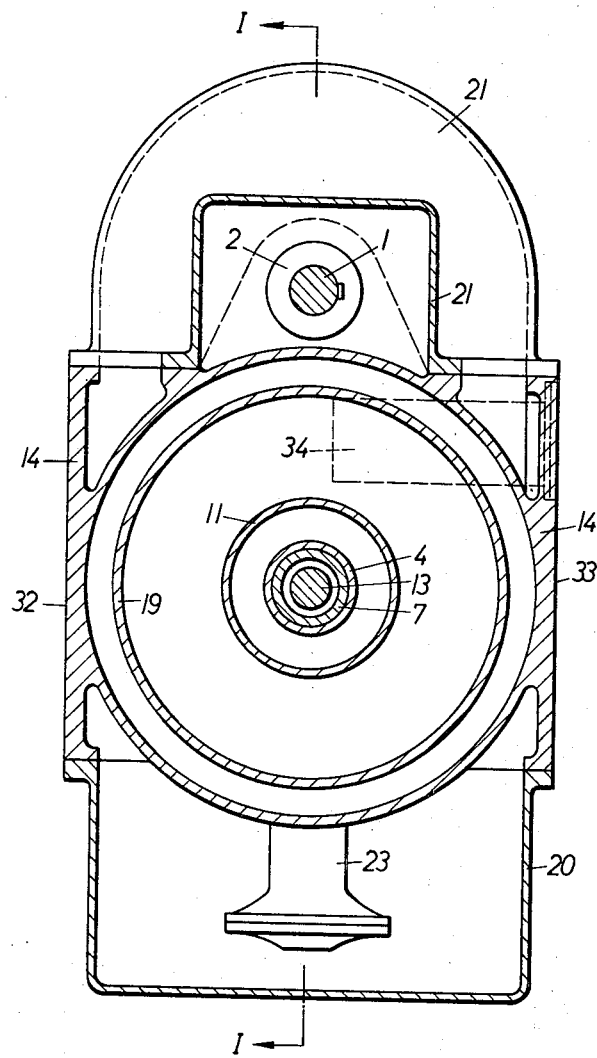

These and other objects and advantages of the invention will apear more clearly from the following specification in connection with the accompanying drawings, in which:

FIG. 1 diagrammatically illustrates a longitudinal section through a fluid flow transmission according to the invention with two torque converters, said section being taken along the line I—I of FIG. 2.

FIG. 2 represents a transverse section through FIG. 1 taken along the line II—II thereof.

Figure 3:
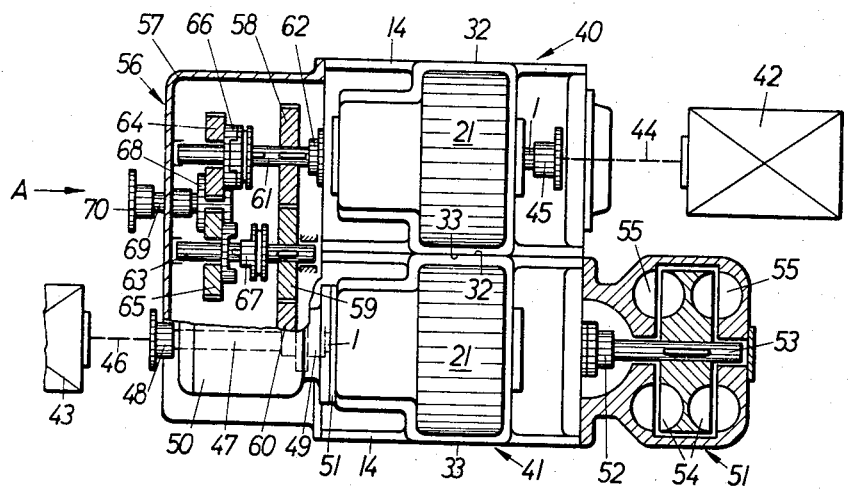

FIG. 3 diagrammatically illustrates partly in section and partly in view two transmissions according to FIG 1 flanged to each other to form a single block.

Figure 4:
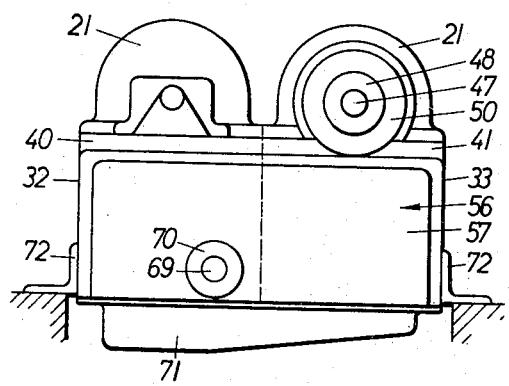

FIG. 4. is an end view of the transmission block of FIG. 3 as seen in the direction of the arrow A.

Figure 5:
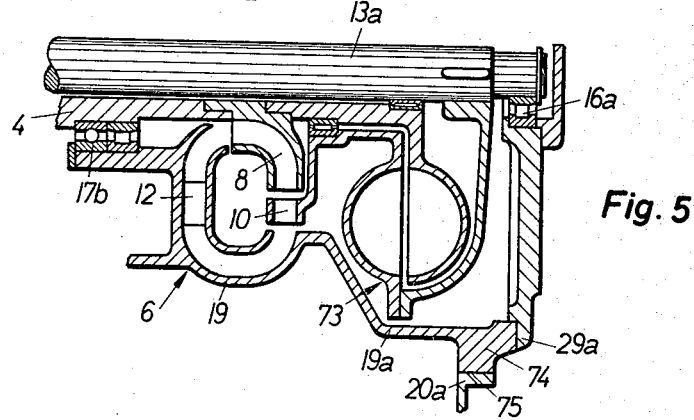

FIG. 5 shows a modification of the right-hand portion of FIG. 1, which differs from the arrangement of FIG. 1 in that the two torque converters are followed by a fluid coupling.

As set forth above, the present invention concerns a transmission with at least one torque converter with input or output through gear means, preferably a pair of gears. With a transmission of this type it is suggested according to the present invention that at least a material portion of the stationary housing for the guide wheel part of at least one torque converter, and that housing part having directly or indirectly mounted therein the bearings for the gear means, and as the case may be that housing which surrounds one or more fluid couplings arranged coaxially with regard to the torque converter part, are formed from a single work piece and represent a single integral supporting housing part. Of this supporting housing part of the transmission, merely that circular-shaped flange or those flanges necessary for the installation of the blade wheels of the torque converter, the gear coaxial therewith and, as the case may be, of the fluid coupling means form separate work pieces.

Referring now to the drawings in detail, the transmission illustrated in FIGS 1 and 2 comprises an input shaft 1 adapted through the intervention of a pair of gears 2, 3 to drive a hollow primary shaft 4. At each end of primary shaft 4 there is arranged a primary part 7 and 8 respectively of two torque converters 5 and 6 respectively having a different transmission ratio, said torque converters 5 and 6 respectively comprising a secondary member 9 and 10 keyed to a common central secondary shaft 13. The guide wheel blades 11 and 12 of said torque converters are respectively connected to a housing part 14b and transmission housing 14.

Shaft 13 forms the output shaft of the transmission and has to both ends thereof keyed jaw clutch members 15 and 15a respectively. In addition to flanges 14a and 14c for bearing 16 of the central secondary shaft 13, transmission housing 14 also houses housing part 14b for a bearing 17a of hollow primary shaft 4 and also bearings 17b and 18 for shafts 4 and 1 respectively. In addition thereto, housing 14 includes the outer confinement 19 of the two torque converters 5 and 6. As will be evident from the drawing, housing 14 is provided with axis-parallel outer flanges 14e, 14f, 14g which will permit the connection thereto of an oil reservoir 20, a hood 21 for gear 2, a further hood 22 for the right-hand end (with regard to FIG. 1) of secondary shaft 13 and for a pump unit 23. Pump unit 23 comprises pump 24, driving gears 25 to 27 therefor and corresponding bearing means while gear 25 meshes with a gear 28 keyed to primary shaft 4.

In addition thereto, transmission housing 14 has surfaces 29, 30 suitable for the flange connection thereto of flanges 14a and 14c of additional units. Flange 14a may be employed as an intermediate flange inasmuch as it is equipped with a surface 14d for screw-connecting thereto other parts.

FIG. 2 further shows the possibility of mounting in a bore of surface 33 a unit 34 adapted to receive the control for the fluid flow circuits.

As will be evident from the above, the transmission housing as just described permits a compact, stable and nevertheless simple and cost-saving construction for the fluid transmission.

This compact construction, in which for instance for rail vehicles there are provided three fluid flow circuits, has over heretofore known transmissions of the type involved the following advantages. The forces between the fluid flow circuit and the eccentrically arranged gear and, as the case may be, the forces between the individual fluid flow circuits are no longer transmitted through flanges but through continuous housing walls. As a result thereof, the housing walls can be made thinner than heretofore, and the weight of the fluid flow transmission can be greatly reduced. In case installation flanges are necessary, cylindrical flanges may be employed which are able to transmit considerable forces and can be produced with considerable precision without high costs. The bores in the housing for the bearings of the fluid flow transmission and the input are now produced in a single integral work piece. This means that chucking operations in the drilling and milling machine tools will be saved while nevertheless the precision of the relative positions of the bores can be increased. Particular advantages are realized when in addition the feed pump is flanged to the compact transmission housing and when the transmission housing is provided with a bore for receiving the control means governing the velocity ranges of the transmission.

Further particular advantages will be obtained when in conformity with a further development of the present invention at least an additional fluid flow transmission, preferably a transmission according to the present invention, is flanged to the longitudinal side of the transmission housing. Such an arrangement is possible without difficulties and without affecting the strength of the structure with the construction of the fluid flow transmission according to the present invention and results in a considerable saving in space and weight. While the space requirement for transmissions flanged to each other is the same as the space required for the separate arrangement of such transmissions, that space will be saved which for various reasons would otherwise remain at those sides which serve for flanging in conformity with the present invention. Moreover, there will now be required a single suspending device only for the transmission block composed of a plurality of transmissions.

As will be seen from the drawings, especially from FIGS. 2, 3 and 4, the transmission according to the present invention is provided with vertical longitudinal side surfaces 32 and 33 which permit the flanging together of two transmissions 40 and 41 of the design shown in FIG. 1 so that a driving unit with two motors 42 and 43 is obtained which is particularly advantageous for use in connection with self-propelled rail vehicles. In such an arrangement, main motor 42 drives shaft 1 of main transmission 40 through the intervention of a shaft 44 and a jaw clutch 45. Auxiliary motor 43 drives shaft 1 of the auxiliary transmission 41 through the intervention of shafts 46 and 47 and jaw clutches 48 and 49. Interposed between shaft 46 and transmission 41 is a generator or lighting dynamo 50 which is flanged through the intervention of an intermediate flange 51 to a surface which corresponds to surface 30 of FIG. 1. The rotor (not visible in the drawing) of generator 50 is keyed to shaft 47. The oppositely located end face of transmission 41 has flanged thereto a fluid brake 51 while the right-hand end (not visible in the drawing) of the central secondary shaft (designated with the reference numeral 13 in FIG. 1) is connected to rotor shaft 53 through the intervention of a shaft coupling 52. Rotor shaft 53 has rotatably connected thereto blading 54. This primary blading 54 is arranged opposite secondary bladings 55 as clearly shown in FIG. 3. The braking effect is brought about by filling the blading chambers with working fluid. It will be evident from the drawing that at least one end face of the transmission housing may be provided with surfaces for direct or indirect connection of one or more fluid circuits or other transmission units as for instance a reversible gear transmission.

In this connection, a particular further advantage will be obtained when the two transmissions of the just described transmission block is followed by a reversible gear transmission common thereto. Such transmission is preferably flanged to the end face of the transmission block (see FIG. 3). In this instance, it is advantageous to couple the input shaft of the reversing gear transmission with the output shaft of one of the two transmissions directly and through the intervention of two or three spur gears with the output shaft of the other transmission. The arrangement of the two transmissions to form a transmission block is taken advantage of not only to provide a reversing gear transmission common thereto but also to save the otherwise necessary transmission elements between said two transmissions and the reversing gear transmission. This has a favorable influence on the production costs, installation costs and the degree of efficiency of the entire installation. A minimum of transmission elements is required with a reversing gear transmission which includes a further shaft parallel to its input shaft and continuously drivingly connected thereto through the intervention of spur gears, when the spur gear mounted on said further shaft meshes with the spur gear on the output shaft of the other transmission. The additional requirement merely involves a spur gear and at best a bearing for the shaft pertaining thereto.

More specifically referring to FIG. 3, the two transmissions 40 and 41 are followed by a reversing gear transmission 56 common to said two transmissions 40 and 41. Said transmission 56 is arranged within a housing 57 flanged to the left-hand end faces—corresponding to 14d of FIG. 1—of said two transmissions 40 and 41. The left-hand ends of the central secondary shafts (not visible in FIG. 3) are drivingly interconnected through spur gears 58 to 60. Spur gear 58 is keyed to a shaft 61 which through a shaft coupling 62 is drivingly connected to the secondary shaft of transmission 40. Spur gear 59 is keyed to a shaft 63. Respectively rotatably but axially non-displaceably mounted on shafts 61 and 63 are spur gears 64 and 65. By means of alternately shiftable jaw clutches 66 and 67, spur gears 64 and 65 are adapted respectively drivingly to be connected with shaft 61 and 63 pertaining thereto. Both spur gears 64 and 65 mesh with a spur gear 68 which is keyed to an output shaft 69 provided with a shaft coupling 70. Shaft 69 forms the common output shaft for both transmissions 40 and 41 and by correspondingly shifting jaw clutches 66 and 67, can be made to rotate in either direction. In this connection, motor 42 or motor 43 or both motors may be engaged.

According to a further development of the present invention, at least one of the longitudinal sides of the transmission housing is provided with a surface for connecting other transmission units, supporting flanges or the like. In this way, the transmission housing which essentially consists of a single integral piece and thus is strong in itself can easily be fastened to a foundation by itself and can easily have other parts connected thereto without the necessity of wall reinforcements which would increase the weight. Furthermore, since the transmission housing as far as its essential parts are concerned has a shape in conformity with the circular shape of the fluid circuits, the housing has a favorable shape as far as strength is concerned.

It is expedient to design housing parts flanged to the single unitary housing piece of light metal or thin metal as for instance sheet metal. This applies in particular to covers, oil reservoirs and the like. With an arrangement according to the present invention, these parts are no longer used for increasing the stability of the transmission housing. Consequently, the weight of the transmission will be further reduced.

As will also be evident from the drawing, both transmissions 40 ad 41 have an oil reservoir 71 common thereto while the lateral surfaces 32 and 33 of transmissions 40 and 41 are provided with angle-shaped supports 72 for resting and connecting the transmission block unit on and to a foundation.

A block unit arrangement as set forth above with at least two motors adapted to be driven individually or together furnishes the possibility of a more economic operation. In this connection, it should be borne in mind that with self-propelled vehicles frequently a partial load operation is desired as is the case, for instance, when the vehicle performs switching operations or operates on secondary tracks. For such an operation, a motor designed for full load operation would be too expensive in view of high fuel costs and great wear. The fact that in conformity with the present invention a single transmission block permits the employment of a plurality of fluid transmission power stages at a maximum degree of efficiency, a considerable reduction in costs is made possible by the numerous possibilities of combining the individual transmissions to a block unit (building block principle). With an arrangement comprising for instance a main motor and an auxiliary motor, the following power stages are obtained:

(a) Auxiliary motor;
(b) Main motor;
(c) Auxiliary motor plus main motor.

The possible combinations for a transmission block unit according to the invention are numerous. A basic series of, for instance, three transmission sizes each and/or transmission types for main and auxiliary transmissions yield nine transmission varients of which each has three power stages. The advantages of such possible combinations are obvious and in this connection there is to be mentioned primarily a more economic production since a greater number of work pieces of the same type can be produced. Furthermore, the installation costs are reduced since the transmission block can be delivered already in assembled form. Furthermore, stockkeeping is reduced and shorter delivery terms can be kept in spite of individual wishes of the customers. The auxiliary motor may, if desired, also temporarily be employed for driving auxiliary units of the vehicle as, for instance, the lighting dynamo, the generator for electric heating, brake air compressor, etc.

A further modification of the present invention is illustrated in FIG. 5 which shows a part of the lower right-hand portion of FIG. 1 with the addition that a fluid coupling 73 follows converter 6. In this instance, housing 19 of FIG. 1 has been extended to form housing 19a which extends around the outer portion of fluid coupling 73. The right-hand end face of housing wall 19a is provided with a flange 74 having an end face 29a which corresponds to the end face 29 of FIG. 1. In addition thereto, flange 74 has an end face 75 for connection with an oil reservoir 20a. The other parts shown in FIG. 5 correspond to those of FIG. 1, and corresponding elements have been designated with the same reference numerals as in FIG. 1 but with the additional character a. All the advantages outlined above in connection with the arrangement of the preceding figures naturally also apply to the modification of FIG. 5 even though this modification has an additional fluid circuit, namely a fluid coupling 73.

It is, of course, to be understood that the present invention is, by no means, limited to the particular constructions shown in the drawings but also comprises any modifications within the scope of the appended claims.

What I claim is:
1. A transmission block especially for vehicles, which includes two transmission units; each of said transmission units comprising: input shaft means, a motor adapted to be drivingly connected to said input shaft means, output shaft means, torque converter means drivingly interposed between said input shaft means and said output shaft means, said torque converter means including guide wheel means and a stationary housing therefor, gear means interposed between and drivingly connected to said torque converter means and one of said shaft means, bearing means supporting said gear means, and housing means supporting said bearing means; at least a major portion said housing means of each of said transmission units and a major portion of the stationary housing of each transmission unit for the guide wheel means thereof consisting of a single unitary piece having at least one lateral connecting surface; means for connecting said units along said lateral surfaces; and means operatively connected to said units for selectively driving said transmission block by either one of said motors only or by both motors together.

2. A transmission block according to claim 1, which includes: a reversing gear transmission connected to one end face of said transmission block and common to said transmission unit, said reversing gear transmission having an input shaft directly drivingly connected with the output shaft means of one of said units, and spur gear means drivingly interconnecting the input shaft of said reversing gear transmission with the output shaft means of said other unit.

3. An arrangement according to claim 2, in which said reversing gear transmission comprises an additional shaft arranged parallel to said input shaft, additional spur gear means continuously drivingly connecting the input shaft with said additional shaft, and means drivingly interconnecting said additional shaft with the output shaft means of said other unit.

References Cited

UNITED STATES PATENTS

| | | | |
|---|---|---|---|
| Re. 25,458 | 10/1963 | Barth et al. | 74—331 |
| 1,484,942 | 2/1924 | Guy et al. | 74—606 X |
| 2,142,199 | 1/1939 | Lysholm | 74—720 X |
| 2,142,269 | 1/1939 | Gossler | 74—720 X |
| 2,420,914 | 5/1947 | Schjolin | 74—720 X |
| 2,459,093 | 1/1949 | Peterson et al. | 74—720 |
| 2,878,691 | 3/1959 | Schjolin | 74—665 |
| 2,910,889 | 11/1959 | Lackey | 74—661 |
| 2,946,238 | 7/1960 | Beyer Stedt | 74—665 |
| 3,023,639 | 3/1962 | Weinrich et al. | 74—730 X |
| 3,065,652 | 11/1962 | Kugel et al. | 74—720 X |
| 3,078,739 | 2/1963 | Weinrich | 74—720 |

FOREIGN PATENTS

| | | |
|---|---|---|
| 9,538 | 11/1956 | Germany. |
| 503,319 | 4/1939 | Great Britain. |

ROBERT M. WALKER, *Primary Examiner.*

DAVID J. WILLIAMOWSKY, DONLEY J. STOCKING,
*Examiners.*

J. R. BENEFIEL, T. C. PERRY, *Assistant Examiners.*